July 17, 1951 N. B. SAUNDERS 2,561,234
CIRCUIT FOR DISTORTION MEASUREMENT
Filed April 30, 1948
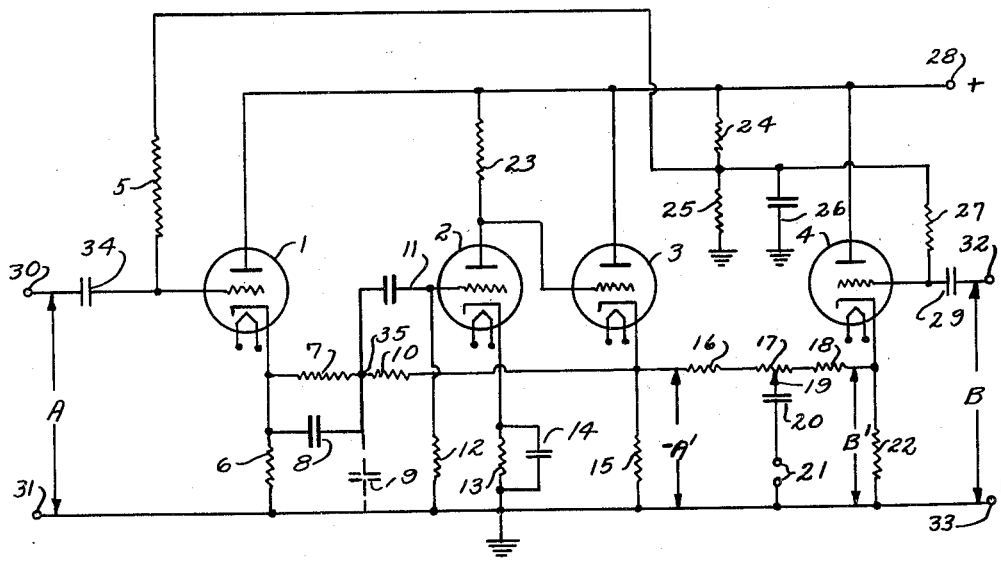
INVENTOR.
NORMAN B. SAUNDERS
BY Wade Trouty AND
ATTORNEY
James S. Shannon
AGENT

UNITED STATES PATENT OFFICE 2,561,234

CIRCUIT FOR DISTORTION MEASUREMENT

Norman B. Saunders, Cambridge, Mass., assignor to the United States of America as represented by the Secretary of the Air Force Application April 30, 1948, Serial No. 24,383

4 Claims. (Cl. 250—27)

The invention described herein may be manufactured and used by or for the Government for governmental purposes without payment to me of any royalty thereon.

This invention relates to means for measuring distortion in electrical waves.

A common method of measuring non-linear distortion consists in passing a pure sine wave through the piece of electrical equipment to be tested and measuring, by means of a highly frequency selective measuring device, the amplitudes of the new frequencies or modulation products generated in the equipment under test. A variation of this method consists in eliminating the fundamental frequency from the output wave and measuring the total modulation products remaining. These methods require the use of a sine wave since any departure of the test wave from a sine wave is indicated as distortion.

For non-sinusoidal waves a common method of measuring distortion is to apply the undistorted and the distorted waves alternately at high speed to a cathode ray oscilloscope so that the two are superimposed on the screen. The amount of distortion may then be measured by measuring the difference in the two waves. The accuracy of this method is limited by the accuracy with which measurements may be made on the screen of the oscilloscope which is usually not more exact than 0.01 fractional.

In certain types of radio equipment it has been found necessary to measure distortion very carefully with the fractional error of measurements being kept less than 0.0003. An instance of this is the measurement of the total distortion of a non-sinusoidal wave such as a "sawthooth" as it passes through electronic amplifiers and accompanying circuits.

It is therefore the object of this invention to provide a means for measuring distortion with a high degree of accuracy by a method that is independent of wave shape.

Briefly the method of the invention consists in deriving a signal proportional to the difference between the distorted and undistorted waves and therefore representative of the distortion. This is accomplished by reversing the phase of either the distorted or the undistorted wave by linear means and electrically adding the two waves.

The figure of the drawing shows a distortion measuring circuit in accordance with the invention.

Referring to the drawing, A represents the undistorted signal and is applied between terminals 30 and 31 while B represents the distorted signal and is applied between terminals 32 and 33. The B signal is applied between the grid of tube 4 and ground by means of coupling condenser 29. The total load impedance 22 of tube 4 is connected between the cathode of this tube and ground so that the entire voltage developed across this resistor is fed back to the input circuit in opposed phase to the signal B. In order to overcome the high negative bias that would otherwise be imposed on the grid of tube 4 by the direct current drop across resistor 22 the grid is connected through resistor 27 to a source of positive potential provided by a potential divider composed of resistors 24 and 25 connected between the point of positive potential 28 and ground, the condenser 26 serving to prevent the application of ripple or other rapid variations in power supply voltage to the grid. The value of the positive potential applied to the grid is such as to provide the proper bias voltage between the grid and cathode of tube 4. Vacuum tube stages of this type are commonly referred to as cathode-followers and are characterized by a very high degree of linearity and a very low output impedance, or, in other words, the voltage B' developed across load resistor 22 appears to come from a generator having a very low internal impedance. These properties are due to the large amount of negative feedback resulting from the location of the load resistance 22. The gain of an amplifier stage employing negative feedback is given by the equation $$G = \frac{A}{1+AB}$$

in which A is the amplification of the stage without feedback and B is the fraction of the output voltage feed back to the input circuit. In the case of a cathode follower $B=1$ and therefore the gain of such a stage is always less than unity but approaches that value for high values of A. It will also be noted that the voltage B' is in phase with the voltage B. Summarizing, the voltage B' is of slightly smaller amplitude than B, has the same wave form as B, is in phase with B and appears to come from a source having a very low internal impedance.

The signal A is applied through condenser 34 to the grid of tube 1 which is part of a cathode-follower stage like that employing tube 4 and described above. The load impedance is formed by resistor 6 and the grid is biased by connection through high resistance 5 to the potential divider 24—25 as in the case of tube 4. Tube 3 is likewise part of a cathode-follower stage having a load resistance 15. A potential divider formed by resistors 7 and 10 is connected between the cathodes of tubes 1 and 3 and the signal developed between the point 35 and ground is applied to the grid of tube 2 through condenser 11. The grid of tube 2 is connected to ground for direct current by high resistance 12 and is biased by biasing network 13—14 located between the cathode of this tube and ground. In order to avoid any frequency discrimination by potential divider 7—10 due to the effect of the inherent circuit capacity 9, a small condenser 8 is connected in shunt to resistor 7 to maintain a constant ratio between impedance 7—8 and impedance 10—9 over the frequency range.

The function of tube 2 to reverse the phase of the signal from tube 1 before its application to the grid of tube 3. The output voltage of tube 2 is developed across load resistor 23 and is applied to the grid of tube 3 by the direct connection between this grid and the anode of tube 2. The potential divider 7—10 performs the dual functions of applying a portion of the output signal of tube 1 to the grid of tube 2 and of applying a portion of the output signal of tube 3 to the grid of tube 2. The latter function causes a certain amount of negative feedback to exist in the phase inverter stage comprising tube 2, the amount of feedback being determined by the gain of the cathode-follower stage containing tube 3 and the relative values of resistors 7 and 10. Also the amount of signal from tube 1 applied to the grid of tube 2 is determined by the relative values of resistors 7 and 10. Decreasing the value of resistor 7 relative to resistor 10 causes an increase in the amount of signal from tube 1 that is applied to tube 2 and also causes a reduction in the amount of negative feedback in the phase inverter stage which results in an increase in the gain of this stage. The net result of the two effects is to increase the amplitude of signal A' developed across resistor 15. Similarly an increase in the value of resistor 7 relative to resistor 10 causes a reduction in the amplitude of A'. Therefore by properly adjusting the relative values of these two resistors the amplitude of A' may be made to bear the same relation to the amplitude of A that the amplitude of B' bears to the amplitude of B. The inverter stage comprising tube 2 is inherently an amplifier of low distortion and with the negative feedback produced by potential divider 7—10 the distortion of this stage is reduced to negligible proportions. Likewise the distortion produced by the cathode-follower stages employing tubes 1 and 3 is of negligible proportions due to the great amount of feedback in the stages. As a result the signal A' has the same wave form as signal A. Also, this signal is reversed in phase with respect to A and, as has already been stated, its amplitude is related to the amplitude of A in the same way that the amplitude of B' is related to the amplitude of B. Furthermore, the signal A' appears to come from a source of low internal impedance due to the action of the cathode-follower stage employing tube 3.

The signals B' and —A', the negative sign being used to denote that the phase is reversed, are added by means of the potentiometer consisting of resistors 16, 17 and 18 and the contact 19. Assuming a measuring instrument having a high input impedance connected across terminals 21 and a condenser 20 having sufficient capacity that its reactance at the operating frequencies is negligible the voltage appearing between terminals 21 is given by the equation $$E = \frac{(R-r)B' - rA'}{R}$$

in which R is the total resistance of resistors 16, 17 and 18, and $r$ is the resistance between contact 19 and the cathode of tube 4. If $$r = \frac{R}{2}$$

this equation reduces to $$E = \frac{B' - A'}{2}$$

It is therefore seen that the voltage E is proportional to the difference in B' and A'.

In using the measuring circuit the undistorted signal is applied between both terminals 30—31 and 32—33 and the contact 19 is adjusted for zero indication on the measuring device connected to terminals 21. The distorted wave B, obtained from the output of the electrical apparatus to which the wave A has been applied, is then applied to the terminals 32—33. The instrument connected to terminals 21 will then give an indication proportional to the distortion of the wave by the electrical apparatus. This distortion is the total distortion of the wave or the sum of all distortions due to phase shift, change of amplitude, frequency discrimination and non-linear elements. Any of these types of distortion which are of no interest can be cancelled out by introducing into the standard or comparison signal A distortion identical to that in B which is to be eliminated from consideration. For example, in order to eliminate changes in amplitude from consideration the signal A should be amplified or attenuated by an amount equal to the amplification or attenuation of B by the equipment under test.

What I claim is:

1. A distortion measuring circuit comprising a first pair of input terminals to which an undistorted wave may be applied and a second pair of input terminals to which a distorted wave resulting from the distortion of said undistorted wave may be applied, a first vacuum tube having an anode, a grid and a cathode, a load impedance connected between the cathode of said first tube and a common point, means connecting one of said first pair of input terminals to the grid of said first tube, means connecting the other of said first pair of input terminals to said common point, a second vacuum tube having an anode, a grid and a cathode, a load impedance connected between the cathode of said second vacuum tube and said tubes, a third vacuum tube having an anode, a cathode and a grid, a biasing network connected between the cathode of said third tube and said common point, a load impedance connected between the anode of said third tube and a source of positive potential, means coupling the grid of said third tube to a point intermediate the ends of the impedance connected between the cathodes of the first and second tubes, means directly coupling the grid of said second tube to the anode of said third tube, a fourth vacuum tube having an anode, a grid and a cathode, a load impedance connected between the cathode of said fourth tube and said common point, means coupling one of said second pair of input terminals to the grid of said fourth tube, means connecting the other of said second pair of input terminals to said common point, an impedance connected between the cathodes of said second and fourth tubes, an adjustable contact on said last named impedance, output terminals connected between said adjustable contact and said common point, and means for applying anode voltages to said first, second and fourth tubes.

2. A distortion measuring circuit comprising a pair of similar coupling networks each having a fixed low output impedance and an input circuit separate from the input circuit of the other, means for applying an undistorted wave to the input of one of said pair of coupling networks, means for applying a distorted wave resulting from the distortion of said undistorted wave to the input of the other of said pair of coupling networks, means for inverting the phase of the wave applied to one of said coupling networks, means for adjusting the relative amplitudes of the output waves of said coupling networks and means for adding the output waves of said pair of coupling networks.

3. Apparatus as claimed in claim 2 in which said coupling networks are cathode-follower stages.

4. Apparatus as claimed in claim 2 in which said phase inverting means is a single linear vacuum tube stage having means providing a large amount of negative feedback.

NORMAN B. SAUNDERS.

REFERENCES CITED

The following references are of record in the file of this patent:

UNITED STATES PATENTS

| Number | Name | Date |
| --- | --- | --- |
| 1,244,697 | Carson | Oct. 30, 1917 |
| 2,227,057 | Blumlien | Dec. 31, 1940 |
| 2,266,154 | Blumlien | Dec. 16, 1941 |
| 2,450,818 | Vermillion | Oct. 5, 1948 |